United States Patent
Park et al.

(10) Patent No.: US 8,624,965 B2
(45) Date of Patent: Jan. 7, 2014

(54) 3D GLASSES DRIVING METHOD AND 3D GLASSES AND 3D IMAGE PROVIDING DISPLAY APPARATUS USING THE SAME

(75) Inventors: Jung-jin Park, Seongnam-si (KR); Jun-ho Sung, Seoul (KR); Ki-bum Seong, Anyang-si (KR); Nak-won Choi, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 414 days.

(21) Appl. No.: 12/902,197

(22) Filed: Oct. 12, 2010

(65) Prior Publication Data

US 2011/0164123 A1 Jul. 7, 2011

(30) Foreign Application Priority Data

Jan. 4, 2010 (KR) .......................... 10-2010-0000174

(51) Int. Cl.
*H04N 13/04* (2006.01)

(52) U.S. Cl.
USPC .......................................................... 348/56

(58) Field of Classification Search
USPC .......................................................... 348/56
See application file for complete search history.

(56) References Cited

U.S. PATENT DOCUMENTS

| 5,452,026 A | 9/1995 | Marcy, III |
| 6,057,811 A | 5/2000 | Edwards |
| 6,687,399 B1 | 2/2004 | Chuang et al. |
| 2010/0091207 A1* | 4/2010 | Hasegawa et al. ............. 349/15 |
| 2010/0225751 A1* | 9/2010 | Nemeth ......................... 348/58 |

FOREIGN PATENT DOCUMENTS

| EP | 0429290 A2 | 5/1991 |
| EP | 2391134 A1 | 11/2011 |
| EP | 2472884 A2 | 7/2012 |

OTHER PUBLICATIONS

Communication, dated Feb. 5, 2013, issued by the European Patent Office in counterpart European Application No. 10192707.7.

* cited by examiner

*Primary Examiner* — David Czekaj
*Assistant Examiner* — Tracy Li
(74) *Attorney, Agent, or Firm* — Sughrue Mion, PLLC

(57) ABSTRACT

A 3D glasses driving method for driving 3D shutter glasses and 3D glasses and a 3D display apparatus using the same, the 3D glasses driving method including: receiving a sync signal from an external device; determining a duty of a driving signal which opens a left eye glass and a right eye glass of the 3D shutter glasses; and opening and closing the left eye glass and the right eye glass of the 3D shutter glasses alternately based on the sync signal and the determined duty. Accordingly, the user is able to watch the 3D image in a descried brightness without experiencing a crosstalk phenomenon.

20 Claims, 7 Drawing Sheets

3D GLASSES DRIVING METHOD AND 3D GLASSES AND 3D IMAGE PROVIDING DISPLAY APPARATUS USING THE SAME

CROSS-REFERENCE TO RELATED APPLICATIONS

This application claims priority from Korean Patent Application No. 10-2010-00174, filed on Jan. 4, 2010 in the Korean Intellectual Property Office, the disclosure of which is incorporated herein by reference in its entirety.

BACKGROUND

1. Field

Apparatuses and methods consistent with exemplary embodiments relate to a three-dimensional (3D) glasses driving method and 3D glasses and a 3D image providing display apparatus using the same, and more particularly, to a 3D glasses driving method using a shutter glasses method and 3D glasses and a 3D image providing display apparatus using the same.

2. Description of the Related Art

Three-dimensional (3D) stereoscopic image technology is applicable to various fields such as information communication, broadcasting, medicine, education and training, military, gaming, animation, virtual reality, computer aided drafting (CAD), and industrial technology. Furthermore, 3D stereoscopic image technology is regarded as a core base technology for next generation 3D stereoscopic multimedia information communication, which is used in all of the aforementioned fields.

Generally, a stereoscopic sense that a person perceives occurs from a complex effect of the degree of a change of thickness of the person's eye lens according to the location of an object to be observed, the angle difference of the object observed from both eyes, the differences of location and shape of the object observed from both eyes, the time difference due to a movement of the object, and other various psychological and memory effects.

In particular, binocular disparity, caused by about a 6~7 cm lateral distance between the person's left eye and right eye, can be regarded as the main cause of the stereoscopic sense. Due to binocular disparity, the person perceives the object with an angle difference, which makes the left eye and the right eye receive different images. When these two images are transmitted to the person's brain through retinas, the brain can perceive the original three-dimensional stereoscopic image by combining the two pieces of information exactly.

There are two types of stereoscopic image display apparatuses: glasses-type apparatuses which special-use glasses, and nonglasses-type apparatuses which do not use such special glasses. A glasses-type apparatus may adopt a color filtering method which separately selects images by filtering colors which are in mutually complementary relationships, a polarized filtering method which separates the images received by a left eye from those received by a right eye using a light-shading effect caused by a combination of polarized light elements meeting at right angles, or a shutter glasses method which enables a person to perceive a stereoscopic sense by blocking a left eye and a right eye alternately in response to a sync signal which projects a left image signal and a right image signal to a screen.

Of the above methods, the shutter glasses method is a display method using a time difference between a left eye and a right eye. To be more specific, the shutter glasses method is a method which synchronizes image provision of a display apparatus with opening and closing of a left eye glass and a right eye glass, so that a person can perceive a sense of space of the image observed from different angles due to functions of the person's brain.

However, a glasses unit of 3D glasses contains liquid crystal. Therefore, in the 3D glasses using the shutter glasses method, if the liquid crystal has a low responding speed, a crosstalk phenomenon where a right eye image is observed from a left eye glass when the left eye glass opens occurs. Thus, the user cannot watch a decent 3D image and, in addition, the user would feel extreme irritation and fatigue in the eyes when watching the 3D image. Therefore, to use the shutter glasses method, there is a need to seek a method to minimize the irritation the user would feel when wearing shutter glasses.

SUMMARY

Exemplary embodiments address at least the above problems and/or disadvantages and other disadvantages not described above. Also, an exemplary embodiment is not required to overcome the disadvantages described above, and an exemplary embodiment may not overcome any of the problems described above.

Exemplary embodiments provide a three-dimensional (3D) glasses driving method which is capable of determining a duty of a driving signal which opens a left eye glass or a right eye glass of 3D glasses, so as to eliminate crosstalk, and 3D glasses and a 3D display apparatus using the same.

According to an aspect of an exemplary embodiment, there is provided a 3D glasses driving method for driving 3D shutter glasses, the method including: receiving a sync signal from an external device; determining a duty cycle of a driving signal which opens a left eye glass and a right eye glass of the 3D shutter glasses; and opening and closing the left eye glass or the right eye glass of the 3D shutter glasses alternately according to the generated driving signal.

The sync signal may be generated as a plurality of pulses occur periodically at every vertical sync (V sync) of the external device.

The determining may determine the driving signal having a transition period by adjusting a length of the duty when the left eye glass or the right eye glass is open.

The determining may include: receiving a particular command of a user; and determining the duty cycle to correspond to the received particular command.

The receiving the particular command of the user may receive the particular command by a user operation unit attached to the 3D glasses.

The user operation unit may be a dial switch or a button.

The external device may be a 3D liquid crystal display (LCD) device.

The determining may include: receiving a duty adjusting command from the external device; and determining the duty to correspond to the received duty adjusting command.

According to an aspect of another exemplary embodiment, there is provided 3D shutter glasses including: a receiving unit which receives a sync signal from an external device; a glasses unit which includes a left eye glass and a right eye glass; a control unit which determines a duty cycle of a driving signal which opens the left eye glass and the right eye glass; and a driving unit which generates the driving signal having the determined duty and transmits the driving signal to the glasses unit.

The sync signal may be generated as a plurality of pulses occur periodically at every vertical sync (V sync) of the external device.

The controlling unit may control the driving unit to generate the driving signal having the transition period by adjusting the length of the duty when the left eye glass or the right eye glass is open.

The controlling unit may determine the duty to correspond to a particular command of the user, in response to the particular command of the user being input.

The 3D glasses may further include a user operation unit which is attached to the 3D shutter glasses to receive the particular command of the user and is capable of adjusting the duty cycle, wherein the control unit controls the driving unit to generate the driving signal having the duty cycle which corresponds to the particular command of the user input.

The user operation unit may be a dial switch or a button.

The external device may be a 3D LCD.

When the duty adjusting command is received from the external device through the receiving unit, the control unit may determine the duty to correspond to the received duty adjusting command.

According to an aspect of another exemplary embodiment, there is provided a 3D image processing apparatus interworking with 3D shutter glasses, the 3D image processing apparatus including: a transmitting unit which transmits a sync signal to the 3D shutter glasses; a user command receiving unit which receives a duty adjusting command of a user to adjust a duty cycle of the 3D shutter glasses; and a control unit which controls the received duty adjusting command to be transmitted to the 3D shutter glasses.

The sync signal may be generated as a plurality of pulses occur periodically at every vertical sync of the external device.

Additional and/or other aspects and advantages will be set forth in part in the description which follows and, in part, will be obvious from the description, or may be learned by practice of exemplary embodiments.

BRIEF DESCRIPTION OF THE DRAWINGS

The above and/or other aspects will be more apparent by describing certain exemplary embodiments with reference to the accompanying drawings, in which.

DETAILED DESCRIPTION OF EXEMPLARY EMBODIMENTS

Figure 1:
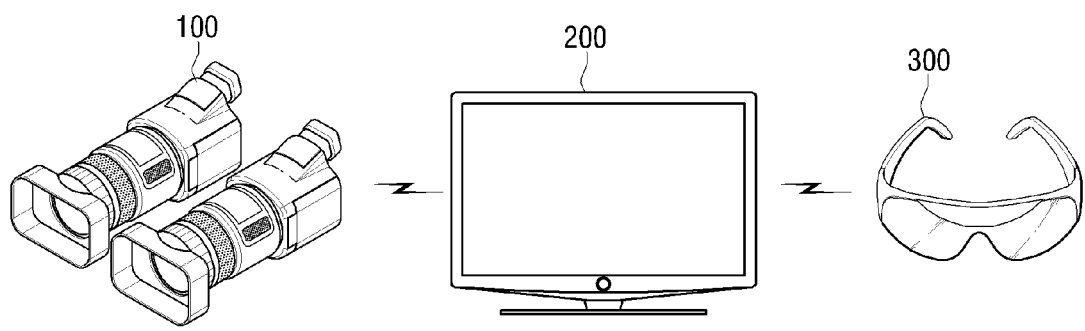
FIG. 1 is a view of a three-dimensional (3D) image providing system according to an exemplary embodiment.

Certain exemplary embodiments will now be described in greater detail with reference to the accompanying drawings. In the following description, the same drawing reference numerals are used for the same elements even in different drawings. The matters defined in the description, such as detailed construction and elements, are provided to assist in a comprehensive understanding of exemplary embodiment. Thus, it is apparent that an exemplary embodiment can be carried out without those specifically defined matters. Also, well-known functions or constructions are not described in detail since they would obscure the exemplary embodiments with unnecessary detail. Moreover, expressions such as "at least one of," when preceding a list of elements, modify the entire list of elements and do not modify the individual elements of the list.

The operating principle and configuration of a three-dimensional (3D) image providing system will now be explained in more detail with reference to FIGS. 1 to 3.

FIG. 1 is a view of the 3D image providing system according to an exemplary embodiment. As illustrated in FIG. 1, the 3D image providing system includes a camera 100 for generating a 3D image, a television (TV) 200 for displaying the 3D image on a screen, and 3D glasses 300 for watching the 3D image.

The camera 100 is a type of photographing apparatus for generating the 3D image. In particular, the camera 100 generates a left eye image to be provided to a left eye of a user, and a right eye image to be provided to a right eye of the user. That is, the 3D image includes a left eye image and a right eye image, and as the left eye image and the right eye image are provided to the left eye and the right eye of the user alternately, a stereoscopic sense occurs due to binocular disparity.

To this end, the camera 100 includes a left eye camera or lens for generating the left eye image and a right eye camera or lens for generating the right eye image. Moreover, the distance between the left eye camera or lens and the right eye camera or lens is determined by taking into account the distance between the left eye and the right eye of the user.

The camera 100 transmits the photographed left eye image and the photographed right eye image to the TV 200. To be more specific, the camera 100 may transmit the left eye image and the right eye image in the format of a frame including one of the left eye image and the right eye image, or in the format of a frame including both the left eye image and the right eye image. Furthermore, the camera 100 may predetermines one from among various 3D image formats, generates the 3D image according to the predetermined format, and transmits the 3D image to the TV 200.

The TV 200 is a type of display apparatus which receives the 3D image directly from a photographing apparatus such as the camera 100, or from a broadcasting station where the 3D image has been transmitted for at least one of editing and processing. The TV 200 processes the 3D image received from either the camera 100 or the broadcasting station, and displays the processed 3D image on the screen. In particular, the TV 200 processes the left eye image and the right eye image taking into account the format of the 3D image, and enables the processed left eye image and the processed right eye image to be displayed alternately in a timesharing manner.

Furthermore, the TV 200 generates a sync signal synchronized with the timing when the left eye image or the right eye image is displayed on the screen in a timesharing manner, and transmits the sync signal to the 3D glasses 300. For example, the sync signal may be generated as a plurality of pulses occur periodically at every vertical sync signal (Vsync) of the TV 200.

A configuration of the TV 200 according to an exemplary embodiment will now be explained in more detail with reference to FIG. 2. FIG. 2 is a block diagram of a TV 200 according to an exemplary embodiment.

Figure 2:
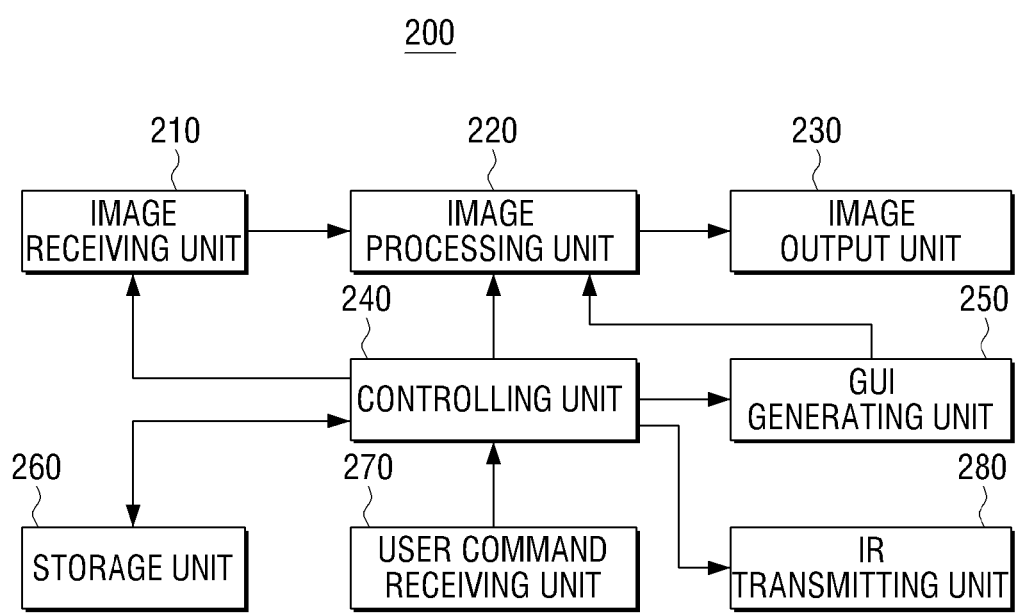
FIG. 2 is a block diagram of a television (TV) providing a 3D image according to an exemplary embodiment.

As illustrated in FIG. 2, the TV 200 includes an image receiving unit 210, an image processing unit 220, an image output unit 230, a controlling unit 240, a Graphical User Interface (GUI) generating unit 250, a storage unit 260, a user command receiving unit 270, and an infrared (IR) transmitting unit 280.

The image receiving unit 210 receives a broadcast transmitted wirelessly or via cables from a broadcasting station or a satellite, and demodulates the received broadcast. The image receiving unit 210 may be connected to an external device such as the camera 100, and may receive a 3D image therefrom. The external device may be connected wirelessly or via cables through an interface such as S-Video, Component, Composite, D-Sub, DVI, and HDMI.

As described above, the 3D image is an image in the format of at least one frame including either of or both the left eye image and the right eye image. That is, the 3D image is an image generated according to one of various 3D formats. Therefore, the 3D image transmitted to the image receiving unit 210 may be in various formats. Specifically, the 3D image may be in one of a general frame sequence method, a top-bottom method, a side by side method, a horizontal interleave method, a vertical interleave method, a checker board method, etc. The image receiving unit 210 transmits the received 3D image to the image processing unit 220.

The image processing unit 220 performs operations of processing signals and adding GUIs such as video decoding, format analyzing, and video scaling on the received 3D image. In particular, the image processing unit 220 generates a left eye image and a right eye image, each of which fits the size of a screen (e.g., 1920×1080), using the format of the 3D image transmitted to the image receiving unit 210.

That is, in the case when the format of the 3D image is any one of a top-bottom method, a side by side method, a horizontal interleave method, a vertical interleave method, or a checker board method, the image processing unit 220 extracts the left eye image portion and the right eye image portion from each image frame, and upscales or interpolates the extracted left eye image and the right eye image, thereby generating a left eye image and a right eye image to be provided to the user.

In a case where the format of the 3D image is in accordance with a general frame sequence method, the image processing unit 220 extracts the left eye image or the right eye image from each frame and makes preparations to provide the extracted image to the user.

Herein, the information on the format of the received 3D image may or may not be included in the 3D image signal. For instance, if the information on the format of the received 3D image is included in the 3D image signal, the image processing unit 220 analyzes the 3D image, extracts the information on the format, and processes the received 3D image according to the extracted information. On the other hand, if the information on the format of the received 3D image is not included in the 3D image signal, the image processing unit 220 processes the received 3D image according to a format input by a user or according to a predetermined format (e.g., a default format). Moreover, the image processing unit 220 enables a GUI received from the GUI generating unit 250 which will be explained below to be added to either of or both the left eye image and the right eye image.

The image processing unit 220 transmits the extracted left eye image and the extracted right eye image alternately in a timesharing manner to the image output unit 230. In other words, the image processing unit 220 transmits the left eye image and the right image to the image output unit 230 in the following order: left eye image (L1)→right eye image (R1) →left eye image (L2)→right eye image (R2)→ . . . .

The image output unit 230 outputs the left eye image and the right eye image transmitted from the image processing unit 220, alternately, and provides the left eye image and the right eye image to the user.

The GUI generating unit 250 generates a GUI to be shown on a display. The GUI generated by the GUI generating unit 250 is applied to the image processing unit 220 and added to either of or both the left eye image and the right eye image to be shown on the display. Furthermore, the GUI generating unit 250 may generate a 3D glasses duty adjusting menu which is capable of adjusting a duty of the 3D glasses 300 inter-working with the TV 200.

The storage unit 260 is a storage medium which stores one or more programs used to operate the TV 200. The storage unit 260 may be external or internal, and may be a volatile memory (such as RAM) or a non-volatile memory (such as ROM, flash memory, or a Hard Disk Drive (HDD)).

The user command receiving unit 270 receives a user command from an input device or method such as a remote control and transmits the received user command to the controlling unit 240. Furthermore, the user command receiving unit 270 may receive a duty adjusting command of the user for adjusting the duty of the 3D glasses 300 through the input device or method such as the remote control.

The IR transmitting unit 280 generates a sync signal synchronized with the left eye image and the right eye image output alternately, and transmits the generated sync signal to the 3D glasses 300 in the form of an infrared ray. Such a sync signal enables the image output unit 230 to display the left eye image during the period when the left eye of the 3D glasses 300 is open and to display the right eye image during the period when the right eye glass of the 3D glasses is open by synchronizing the TV 200 and the 3D glasses 300 as the 3D glasses 300 open and close alternately.

In addition, when the duty adjusting command of the 3D glasses 300 is input through the user command receiving unit 270, the IR transmitting unit 280 may transmit the input duty adjusting command to the 3D glasses 300.

The controlling unit 240 controls overall operations of the TV 200 according to the user command received from the user command receiving unit 270. In particular, the controlling unit 240 controls the image receiving unit 210 and the image processing unit 220 so that the 3D image can be received, the received 3D image can be separated into the left eye image and the right eye image, and each of the separated left eye image and the right eye image can be scaled or interpolated to fit one screen.

Furthermore, the controlling unit 240 controls the GUI generating unit 250 so that the GUI which corresponds to the user command received from the user command receiving unit 270 can be generated. Also, the controlling unit 240 controls the IR transmitting unit 280 so that the sync signal which has been synchronized with the output timing of the left eye image or the right eye image can be generated and transmitted. In addition, when the duty adjusting command is input through the user command receiving unit 270, the controlling unit 240 may control the IR transmitting unit 280 to transmit the input duty adjusting command to the 3D glasses 300.

Meanwhile, a left eye glass and a right eye glass of the 3D glasses 300 open and close alternately according to the sync signal received from the TV 200, enabling the user to watch the left eye image and the right eye image through the left eye and the right eye, respectively. The configuration of the 3D glasses will now be explained in more detail with reference to FIGS. 3 and 4.

Figure 3:
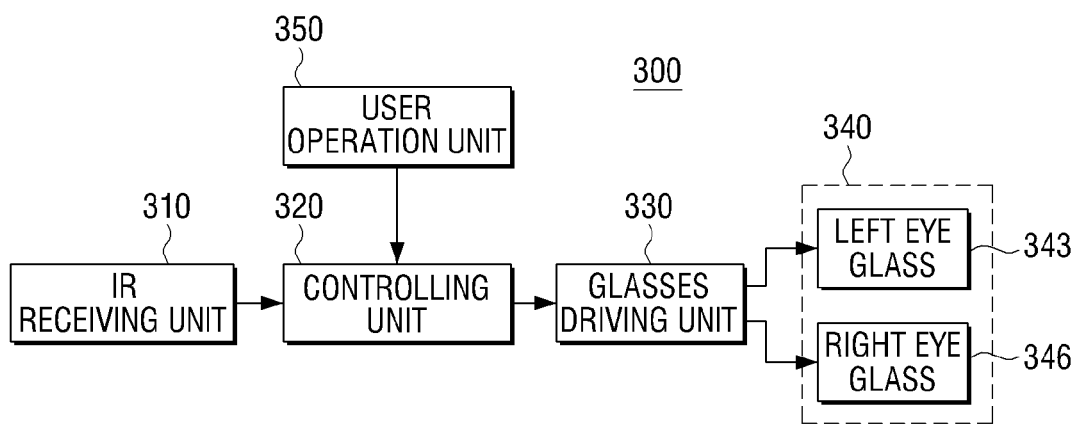
FIG. 3 is a block diagram of 3D glasses according to an exemplary embodiment.

FIG. 3 is a block diagram of 3D glasses 300 according to an exemplary embodiment. As illustrated in FIG. 3, the 3D glasses 300 include an IR receiving unit 310, a controlling unit 320, a glasses driving unit 330, a glasses unit 340, and a user operation unit 350.

The IR receiving unit 310 receives the sync signal regarding the 3D image from the IR transmitting unit 280 of the TV 200 connected wirelessly or via cables. Specifically, the IR transmitting unit 280 emits the sync signal using an infrared ray having a straightness characteristic, and the IR receiving unit 310 receives the sync signal from the emitted infrared ray. For example, the sync signal which is transmitted from the IR transmitting unit 280 to the IR receiving unit 310 may be an infrared ray signal having a frequency of 60 Hz.

The IR receiving unit 310 transmits the received output signal to the controlling unit 320 according to the sync signal received from the IR transmitting unit 280.

The controlling unit 320 controls an overall operation of the shutter glasses 300. In particular, the controlling unit 320 generates a control signal based on the output signal received from the IR receiving unit 310, and transmits the generated control signal to the glasses driving unit 330 to control the glasses driving unit 330. In particular, the controlling unit 320 controls the glasses driving unit 330 to generate a driving signal for driving the glasses unit 340 based on the output signal.

The glasses driving unit 330 generates the driving signal based on the control signal received from the controlling unit 320. In particular, since the glasses unit 340 includes a left eye glass 343 and a right eye glass 346, the glasses driving unit 330 generates a left eye glass driving signal and a right eye glass driving signal for driving the left eye glass 343 and the right eye glass 346, respectively. Furthermore, the glasses driving unit 330 transmits the generated left eye glass driving signal and the right eye glass driving signal to the left eye glass 343 and the right eye glass 346, respectively.

The glasses driving unit 330 adjusts the duty of the driving signal having a transition period between the open period and the closed period of the left glass 343 and the right glass 346, and transmits the driving signal having the adjusted duty to the glasses unit 340. Herein, the transition period refers to the period when the left glass 343 and the right glass 346 are both closed. Such driving methods of the glasses driving unit 330 will be described below in detail with reference to FIG. 5.

As described above, the glasses unit 340 includes the left eye glass 343 and the right eye glass 346, and opens or closes each glass according to the driving signal received from the glass driving unit 330. In particular, the left eye glass 343 and the right eye glass 346 are made of materials which include liquid crystal. Therefore, due to the responding speed of the liquid crystal, when a glass opens, the crosstalk phenomenon occurs where the right eye image is seen from the left glass 343 or the left eye image is seen from the right glass 346. In order to eliminate such a crosstalk phenomenon, the glasses driving unit 330 generates the driving signal having a transition period between the open period and closed period of the left glass 343 and the right glass 346, and transmits the generated driving signal to the glasses unit 340. As a result, irritation and fatigue which the user may feel while wearing the shutter glasses 300 is minimized or eliminated.

The user operation unit 350 receives a user operation command for adjusting the transition period, which is when one of the left eye glass 343 and the right eye glass 346 closes until the other eye glass 346 or 343 opens, i.e., when both glasses 343 and 346 are closed. More specifically, when the user operation command is input, the controlling unit 320 controls the driving unit 330 to generate a driving signal having a length of duty, that is, regarding when the left eye glass 343 and the right eye glass 346 open, corresponding to the user adjusting command. By generating the driving signal having the length of duty when the left eye glass 343 or the right eye glass 346 is open corresponding to the user operation command, the 3D glasses 300 are able to adjust the transition period. As an example, the user adjusting unit 350 may be a dial switch or a button.

As described above, by adjusting the transition period through the user operation unit 350, the user is able to eliminate the crosstalk phenomenon, and watch the 3D image in a desired brightness.

Figure 4:
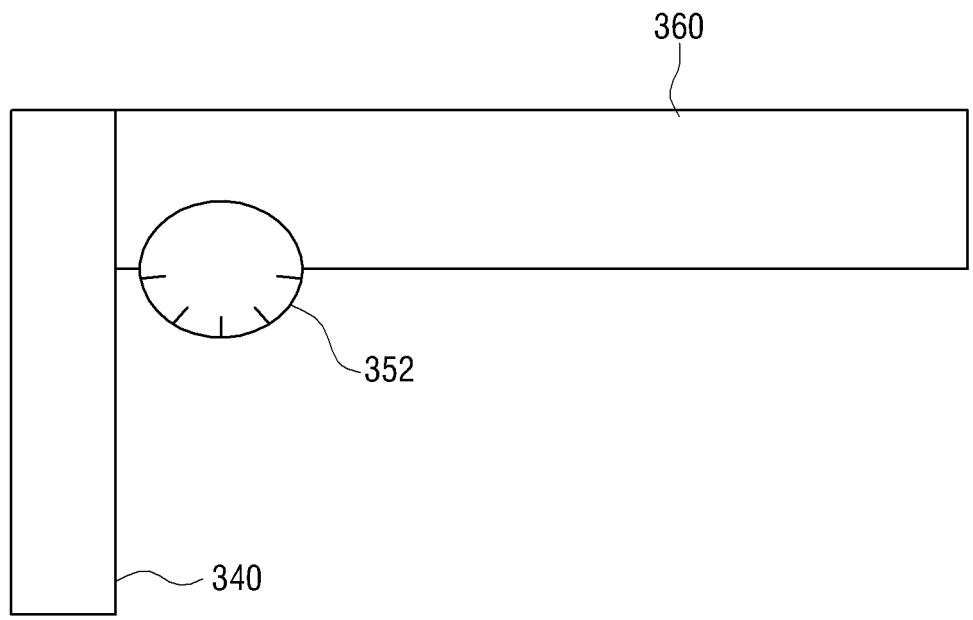
FIG. 4 is a simplified side view of 3D glasses according to an exemplary embodiment.

FIG. 4 is a simple side view of the 3D glasses 300 to which a dial switch 352 has been attached, according to an exemplary embodiment. FIG. 4 illustrates an example of the user operation unit 350 being a dial switch 352, though it is understood that another exemplary embodiment is not limited thereto.

As illustrated in FIG. 4, the dial switch 352 is attached to a rim 360 of the 3D glasses. Therefore, the user can adjust the transition period of the 3D glasses through the dial switch more easily and conveniently.

Moreover, the dial switch 352 has gradations, which enable the user to determine how much the transition period has been adjusted.

When a particular command of the user is input through the dial switch 352, the glasses unit 340 opens and closes the left eye glass 343 or the right eye glass 346 alternately according to the driving signal having the transition period of the length corresponding to the particular command of the user.

Figure 5:
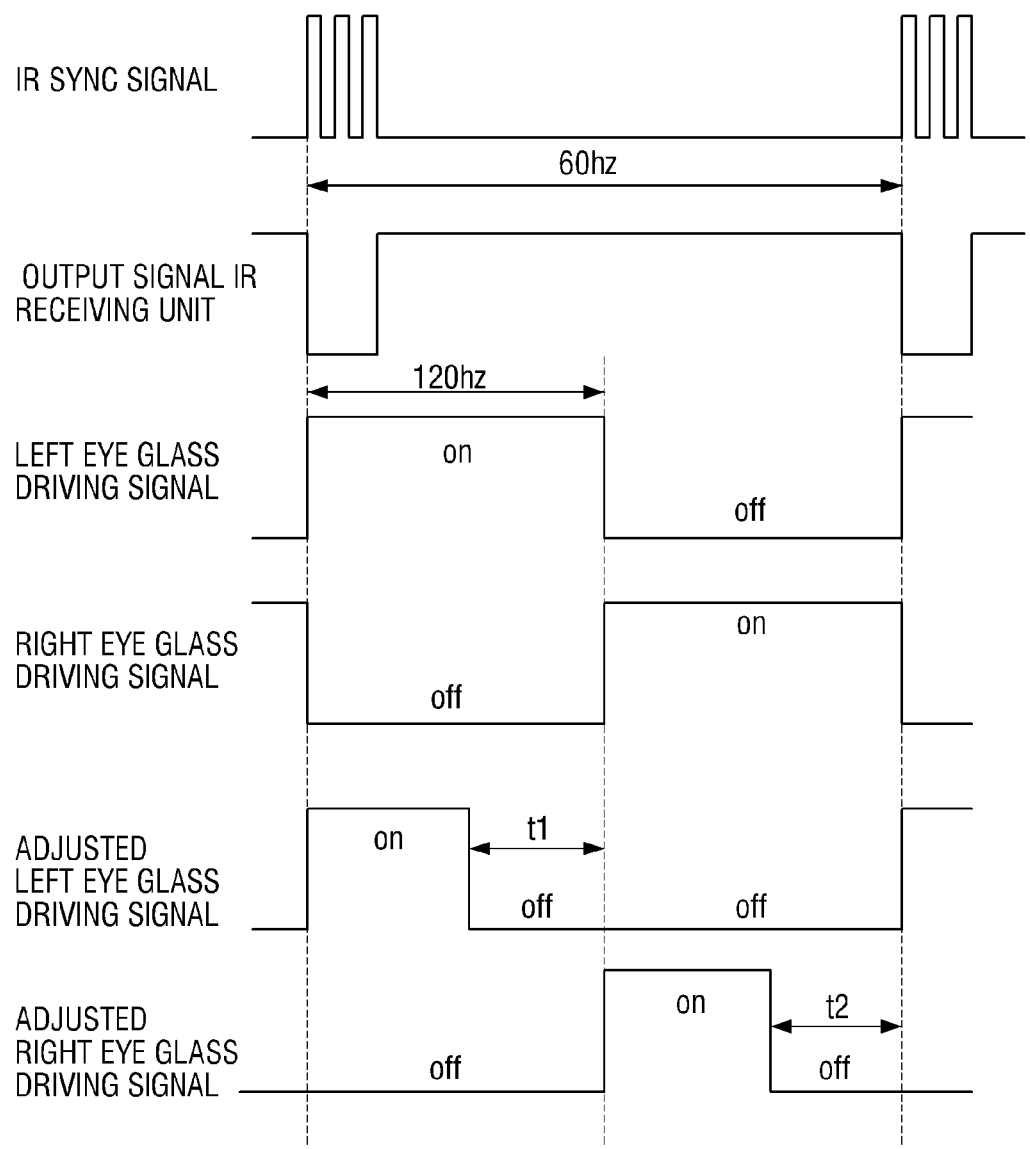
FIG. 5 is a view illustrating a method of adjusting a 3D glasses driving signal according to an exemplary embodiment.

The 3D glasses driving method for eliminating the crosstalk phenomenon of the 3D image will now be explained below with reference to FIGS. 5 and 6. FIG. 5 is a view explaining a method of adjusting a 3D glasses driving signal according to an exemplary embodiment.

The 3D glasses 300 receive an IR sync signal from the TV 200 through the IR receiving unit 310. As illustrated in FIG. 5, the IR sync signal according to an exemplary embodiment has a frequency of 60 Hz, and has three pulses of short wavelengths within one cycle. The reason the IR sync signal has three pulses within a cycle is to evade interference with other infrared ray signals.

When the IR receiving unit 310 receives the sync signal having a frequency of 60 Hz from the TV 200, the IR receiving unit 310 generates an output signal to be transmitted to the controlling unit 320 according to the received IR sync signal. Like the IR sync signal, the output signal also has a frequency of 60 Hz.

Upon receiving the output signal from the IR receiving unit 310, the controlling unit 320 controls the glasses driving unit 330 to generate a driving signal. Herein, the driving signal includes a left eye glass driving signal for driving the left eye glass 343 and a right eye glass driving signal for driving the right eye glass 346.

The left eye glass 343 and the right eye glass 346 open and close alternately, and thus, as illustrated in the third and fourth graphs from the top in FIG. 5, the left eye glass driving signal and the right eye glass signal have frequencies of 120 Hz. Therefore, each of the left eye glass 343 and the right eye glass 346 opens and closes alternately every $1/120$ seconds. Herein, the right eye glass 346 opens the moment the left eye glass 343 closes. However, if the responding speed of the liquid crystal in the left eye glass 343 is low, the user would see the right eye image through the left eye glass 343.

When a particular operation of the user is input through the user operation unit 350 in order to eliminate such a crosstalk phenomenon, the controlling unit 320 controls the glasses driving unit 330 to generate a driving signal having a transition period between when one of the left eye glass 343 and the right eye glass 346 closes until the other eye glass 346 or 343 opens. That is, the controlling unit 320 controls the glasses driving unit 330 to generate a driving signal having a transition period by controlling the length of the duty when the left eye glass 343 or the right eye glass 346 opens.

For example, when a command is input through the user operation unit 350 to reduce the length of the duty when the left eye glass 343 or the right eye glass 346 is open to 50%, the controlling unit 320 controls the glasses driving unit 330 to generate a driving signal having a length of the duty, each of which is 50% less than a previous length of the duty. Therefore, due to the adjusted left eye glass driving signal, the left eye glass 343 is open for $1/240$ seconds and closed for $3/240$ seconds per cycle of the IR sync signal. Likewise, the right eye glass 346 is open for $1/240$ seconds and closed for $3/240$ seconds per cycle of the IR sync signal.

Furthermore, as illustrated in the fifth graph from the top in FIG. 5, between when the left eye glass 343 closes and the right eye glass 346 opens, there exists a transition period ($t_1$), which is when both the left eye glass 343 and the right eye glass 346 are closed. For example, the transition period ($t_1$) may be $1/240$ seconds. Accordingly, since all the responses of the liquid crystal in the left eye glass 343 finish during the transition period ($t_1$), the crosstalk phenomenon where the right eye image is seen from the left eye glass 343 can be eliminated.

As illustrated in the sixth graph from the top in FIG. 5, between when the right eye glass 346 closes until the left eye glass 343 opens, there exists a transition period ($t_2$), which is when both the left eye glass 343 and the right eye glass 346 are closed. In the same manner, the transition period ($t_2$) may be $1/240$ seconds, and all the responses of the liquid crystal in the right eye glass 346 finish during the transition period ($t_2$). Accordingly, the crosstalk phenomenon where the left eye image is seen from the right eye glass 346 can be eliminated.

As described above, if there is such a transition period between when the left eye glass 343 or the right eye glass 346 closes and opens, the crosstalk phenomenon can be eliminated. Furthermore, since the user can adjust the transition period through the user operation unit 350, the user is able to watch the 3D image in a desired brightness without experiencing the crosstalk phenomenon. Therefore, the user can have a more comfortable 3D image watching experience.

Figure 6:
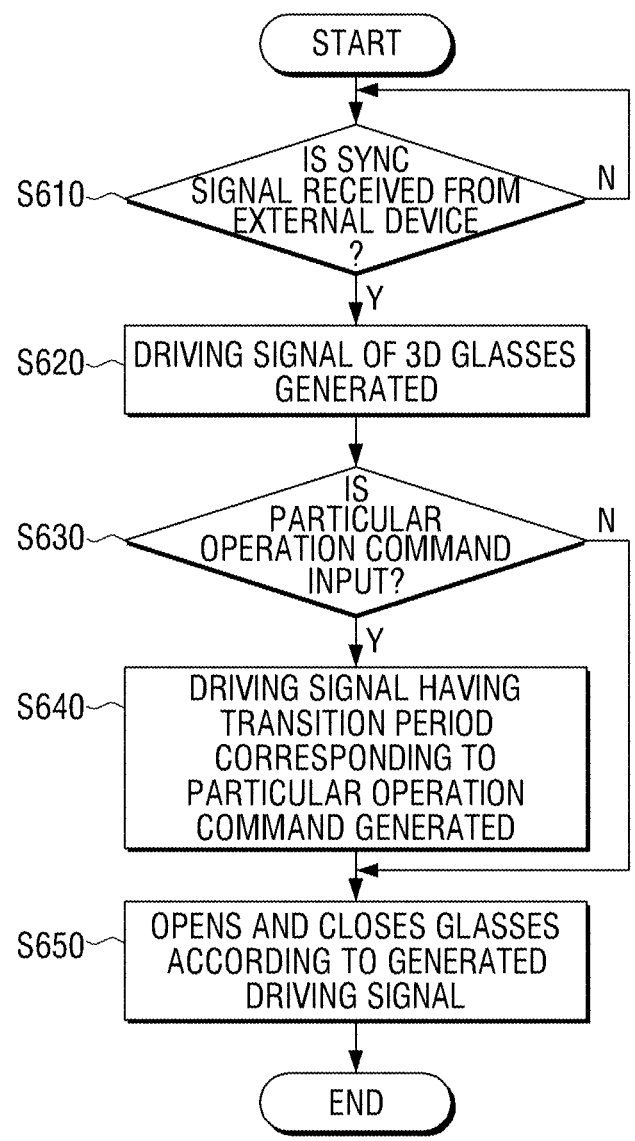
FIG. 6 is a flowchart illustrating in detail a process of driving 3D glasses according to an exemplary embodiment; and, FIG. 7 is a view illustrating a method of adjusting a 3D glasses driving signal in a TV according to an exemplary embodiment.

FIG. 6 is a flowchart illustrating in detail a process of driving the 3D glasses 300 according to an exemplary embodiment. Referring to FIG. 6, the 3D glasses 300 receive a sync signal from the external device (e.g., the TV 200) (S610). While the present exemplary embodiment describes the sync signal as being received from the TV 200, it is understood that another exemplary embodiment is not limited thereto. For example, according to another exemplary embodiment, the sync signal may be received from another type of external device, such as a set top box or a stand-alone IR transmitter. Upon receiving the sync signal (S610-Y), the 3D glasses 300 generate a driving signal for driving the left eye glass 343 and the right eye glass 346 (S620).

Thereafter, the 3D glasses 300 determine whether a particular operation command of the user to adjust the transition period between when the left eye glass 343 and the right eye glass 346 open and close is input (S630). If the particular operation command of the user has not been input (S630-N), the 3D glasses 300 drive the left eye glass 343 and the right eye glass 346 through the generated driving signal (S650).

On the other hand, if the particular operation command of the user has been input (S630-Y), the 3D glasses 300 generate a driving signal having a transition period which corresponds to the particular operation command. For example, if a command has been input to reduce the length of the duty or the duty ratio, which is the period when the left glass 343 or the right glass 346 is open, to be 50%, the 3D glasses 300 generate a driving signal having a length of duty for each of the left eye glass driving signal and the right eye glass driving signal that is 50% less than a previous length of duty, or a predetermined length of duty (e.g., a default length of duty). For example, as a result of the particular operation command, the driving signal has a transition period which is 50% shorter than a total single period of the driving signal.

When the driving signal having the transition period adjusted by the particular operation command of the user is generated as described above, the user is able to watch the 3D image in a desired brightness without experiencing the crosstalk phenomenon as explained above with reference to FIG. 5.

Figure 7:
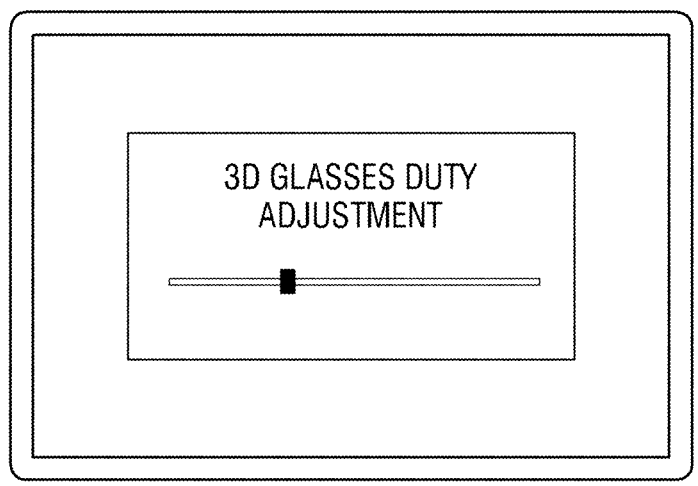

Hereinbelow, a method of adjusting a duty of 3D glasses 300 through a TV 200 according to another exemplary embodiment will now be explained with reference to FIG. 7. FIG. 7 is a view which illustrates the method of adjusting the driving signal of the 3D glasses 300 according to another exemplary embodiment. Referring to FIG. 7, when the duty adjusting command of the 3D glasses 300 is input through the user command receiving unit 270, the TV 200 generates a UI menu. As illustrated in FIG. 7, the 3D glasses duty adjusting menu includes an adjusting bar.

When the user inputs the duty adjusting command of the 3D glasses 300 through, for example, a remote control, the TV 200 receives the duty adjusting command through the user command receiving unit 270. Furthermore, the TV 200 transmits the duty adjusting command to the 3D glasses 300 together with the sync signal through the IR transmitting unit 280.

When the 3D glasses 300 receives the sync signal and the duty adjusting command, the 3D glasses 300 generates a driving signal according to the received sync signal and the duty adjusting command. Moreover, the 3D glasses 300 open and close the left eye glass 343 and the right eye glass 346 alternately, according to the generated driving signal.

As described above, by adjusting the duty of the 3D glasses 300 through the TV 200, the user is able to watch the 3D image in a desired brightness without experiencing a crosstalk phenomenon.

While in the above-described exemplary embodiments, the length of the duty is reduced to 50%, it is understood that another exemplary embodiment is not limited thereto. That is, aspects also apply to when setting the length of the duty differently.

According to the aforementioned exemplary embodiments, a user is able to adjust a length a the duty of 3D glasses. Thus, when the user watches a 3D image wearing the 3D glasses, the user is provided with the 3D image without the crosstalk phenomenon.

While not restricted thereto, exemplary embodiments can also be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, exemplary embodiments may be written as computer programs transmitted over a computer-readable transmission medium, such as a carrier wave, and received and implemented in general-use or special-purpose digital computers that execute the programs. Moreover, while not required in all aspects, one or more units of the TV 200, external device, or 3D glasses 300 can include a processor or microprocessor executing a computer program stored in a computer-readable medium.

The foregoing exemplary embodiments and advantages are merely exemplary and are not to be construed as limiting the present invention. That is, aspects and advantages can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A three-dimensional (3D) glasses driving method for driving 3D shutter glasses, the 3D glasses driving method comprising:
    receiving a sync signal from an external device;
    determining a duty cycle of a driving signal which opens a left eye glass and a right eye glass of the 3D shutter glasses; and
    opening and closing the left eye glass and the right eye glass of the 3D shutter glasses based on the sync signal and the determined duty cycle,
    wherein the determining comprises determining a transition period of the driving signal by adjusting at least one of a length of a duty when the left eye glass is open and a length of a duty when the right eye glass is open, the transition period being a variable period in which both the left eye glass and the right eye glass are simultaneously closed, and the transition period being variable in accordance with the adjusted at least one of the length of the duty when the left eye glass is open and the length of the duty when the right eye glass is open.

2. The 3D glasses driving method as claimed in claim 1, wherein the sync signal is generated as a plurality of pulses occur periodically at every vertical sync signal (Vsync) of the external device.

3. The 3D glasses driving method as claimed in claim 1, wherein the determining further comprises:
    receiving a user input; and
    determining the duty cycle to correspond to the received user input.

4. The 3D glasses driving method as claimed in claim 3, wherein the receiving the user input comprises receiving the user input directly from a user through a user operation unit attached to the 3D shutter glasses.

5. The 3D glasses driving method as claimed in claim 3, wherein the user operation unit is a dial switch or a button.

6. The 3D glasses driving method as claimed in claim 1, wherein the external device is a 3D liquid crystal display device.

7. The 3D glasses driving method as claimed in claim 1, wherein the determining further comprises:
    receiving a duty cycle adjusting command from the external device; and
    determining the duty cycle to correspond to the received duty cycle adjusting command.

8. The 3D glasses driving method as claimed in claim 1, wherein the external device displays a 3D image corresponding to the sync signal.

9. Three-dimensional (3D) shutter glasses comprising:
    a receiving unit which receives a sync signal from an external device;
    a glasses unit which comprises a left eye glass and a right eye glass;
    a control unit which determines a duty cycle of a driving signal which opens the left eye glass and the right eye glass; and
    a driving unit which generates the driving signal having the determined duty cycle and transmits the driving signal to the glasses unit,
    wherein the control unit controls the driving unit to generate the driving signal having a transition period by adjusting at least one of a length of a duty when the left eye glass is open and a length of a duty when the right eye glass is open, the transition period being a variable period in which both the left eye glass and the right eye glass are simultaneously closed, and the transition period being variable in accordance with the adjusted at least one of the length of the duty when the left eye glass is open and the length of the duty when the right eye glass is open.

10. The 3D shutter glasses as claimed in claim 9, wherein the sync signal is generated as a plurality of pulses occur periodically at every vertical sync signal (Vsync) of the external device.

11. The 3D shutter glasses as claimed in claim 9, wherein, in response to receiving a user input, the control unit determines the duty cycle to correspond to the received user input.

12. The 3D shutter glasses as claimed in claim 11, further comprising a user operation unit which receives the user input directly from a user.

13. The 3D shutter glasses as claimed in claim 12, wherein the user operation unit is a dial switch or a button.

14. The 3D shutter glasses as claimed in claim 9, wherein the external device is a 3D liquid crystal display device.

15. The 3D shutter glasses as claimed in claim 9, wherein, in response to the receiving unit receiving a duty adjusting command from the external device, the control unit determines the duty cycle to correspond to the received duty adjusting command.

16. A three-dimensional (3D) image processing apparatus interworking with 3D shutter glasses, the 3D image processing apparatus comprising:
    a transmitting unit which transmits a sync signal to the 3D shutter glasses;
    a user command receiving unit which receives a duty adjusting command of a user to adjust a duty cycle of the 3D shutter glasses; and
    a control unit which controls the received duty adjusting command to be transmitted to the 3D shutter glasses,
    wherein the duty adjusting command is a command to adjust a transition period of a driving signal, which opens a left eye glass and a right eye glass of the 3D shutter glasses, by adjusting at least one of a length of a duty when the left eye glass is open and a length of a duty when the right eye glass is open, the transition period being a period in which both the left eye glass and the right eye glass are simultaneously closed, and the transition period being variable in accordance with the adjusted at least one of the length of the duty when the left eye glass is open and the length of the duty when the right eye glass is open.

17. The 3D image processing apparatus as claimed in claim 16, wherein the sync signal is generated as a plurality of pulses occur periodically at every vertical sync signal (Vsync) of the image processing apparatus.

18. The 3D image processing apparatus as claimed in claim 16, wherein the control unit controls the transmitting unit to transmit the received duty adjusting command with the sync signal.

19. A display device comprising the 3D image processing apparatus of claim 16.

20. A non-transitory computer readable recording medium having recorded thereon a program executable by a computer for performing the method of claim 1.

* * * * *